(12) United States Patent
Tiana et al.

(10) Patent No.: US 9,669,940 B1
(45) Date of Patent: Jun. 6, 2017

(54) LATENCY-REDUCING IMAGE GENERATING SYSTEM, DEVICE, AND METHOD

(71) Applicants: Carlo L. Tiana, Portland, OR (US); Weston J. Lahr, Sherwood, OR (US)

(72) Inventors: Carlo L. Tiana, Portland, OR (US); Weston J. Lahr, Sherwood, OR (US)

(73) Assignee: Rockwell Collins, Inc., Cedar Rapids, IA (US)

( * ) Notice: Subject to any disclaimer, the term of this patent is extended or adjusted under 35 U.S.C. 154(b) by 382 days.

(21) Appl. No.: 13/928,792

(22) Filed: Jun. 27, 2013

(51) Int. Cl.
   | | |
   |---|---|
   | *G01C 23/00* | (2006.01) |
   | *G01C 21/00* | (2006.01) |
   | *G05D 1/00* | (2006.01) |
   | *B64D 45/00* | (2006.01) |
   | *G08G 5/00* | (2006.01) |
   | *G01S 19/15* | (2010.01) |

(52) U.S. Cl.
   CPC ............. *B64D 45/00* (2013.01); *G01C 23/00* (2013.01); *G01S 19/15* (2013.01); *G08G 5/0021* (2013.01); *G09G 2340/10* (2013.01)

(58) Field of Classification Search
   CPC  B64D 45/00; B64D 2011/0061; G01C 23/00; G01C 23/005; G01C 21/005; G01C 21/10; G01C 21/16; G01C 21/165; G01C 5/005; G08G 5/0091; G08G 5/0039; G08G 5/00; G01S 17/88; G01S 2205/003; G01S 2205/005; F05B 2270/8042; G09G 2340/045; G09G 2380/12
   See application file for complete search history.

(56) References Cited

U.S. PATENT DOCUMENTS

| | | | | |
|---|---|---|---|---|
| 5,128,874 A | * | 7/1992 | Bhanu et al. | 701/301 |
| 5,548,516 A | * | 8/1996 | Gudat et al. | 701/23 |
| 6,285,298 B1 | * | 9/2001 | Gordon | 340/945 |
| 7,280,498 B1 | * | 10/2007 | Mitchell | 370/316 |
| 8,019,490 B2 | * | 9/2011 | Ferren et al. | 701/3 |
| 8,265,802 B2 | * | 9/2012 | Bazile | G05D 1/0825 701/3 |
| 8,406,466 B2 | * | 3/2013 | He | 382/103 |
| 8,571,728 B1 | * | 10/2013 | Wenger et al. | 701/4 |
| 8,655,819 B1 | * | 2/2014 | Burkard | G06N 99/005 706/45 |
| 8,692,705 B2 | * | 4/2014 | Smith et al. | 342/30 |

(Continued)

*Primary Examiner* — Jerrah Edwards
*Assistant Examiner* — Demetra Smith-Stewart
(74) *Attorney, Agent, or Firm* — Daniel M. Barbieri; Donna P. Suchy; Angel N. Gerdzhikov

(57) ABSTRACT

A present novel and non-trivial system, device, and method for reducing image generating latency of an image presented on a display unit are disclosed. An image processing unit ("IPU") may receive the image data set; receive (1) first navigation data of a first time from which second navigation data of the second time is determined or (2) second navigation data of a second time; receive third navigation data of the second time; compare the second navigation data with the third navigation data; and select a subset of the image data set in response to the comparison. Differences arising from the comparison, if any, may be used in determining the location and/or rotation of a cropping frame that selects the subset and forms a cropped image which is then provided to a display system, whereby the image represented in the subset is presented to the viewer.

18 Claims, 10 Drawing Sheets

(56) References Cited

U.S. PATENT DOCUMENTS

| | | | |
|---|---|---|---|
| 8,694,251 B2* | 4/2014 | Janardhanan et al. | 701/512 |
| 8,917,322 B2* | 12/2014 | Olson et al. | 348/143 |
| 8,918,280 B1* | 12/2014 | Heinrich | G08G 5/0013 |
| | | | 244/175 |
| 8,928,527 B2* | 1/2015 | He et al. | 342/357.32 |
| 9,222,799 B1* | 12/2015 | Bell | G01C 23/00 |
| 2007/0005199 A1* | 1/2007 | He | G01C 23/00 |
| | | | 701/16 |
| 2009/0005986 A1* | 1/2009 | Soehren | G01C 21/16 |
| | | | 701/500 |
| 2011/0218733 A1* | 9/2011 | Hamza | G01C 21/165 |
| | | | 701/469 |
| 2012/0209514 A1* | 8/2012 | Chrysanthakopoulos | G06K 9/00671 |
| | | | 701/431 |
| 2014/0277956 A1* | 9/2014 | Morin | E02F 3/844 |
| | | | 701/50 |

* cited by examiner

LATENCY-REDUCING IMAGE GENERATING SYSTEM, DEVICE, AND METHOD

BACKGROUND OF THE INVENTION

Field of the Invention

This invention pertains generally to the field of vehicles display units such as an aircraft display unit that provide information to the vehicle operator such as a pilot of an aircraft.

Description of the Related Art

The presentation a three-dimensional perspective of an image of the scene outside the aircraft is common. Prior to presenting the image, an image generating process must be performed. Generally, navigation data representative of the aircraft position (e.g., latitude, longitude, and altitude) and aircraft direction (e.g., heading) is used to retrieve terrain and/or obstacle data. Once this data is retrieved, an image data set representative of an image of a realistic, three-dimensional perspective of the scene outside the aircraft may be generated, provided to the display system, and subsequently displayed to the pilot.

Although the display of such image is beneficial to the pilot, the performance of the above-discussed steps creates an inherent latency in the image generation process. Although the speed of image generating processors in general continues to increase, there nevertheless exists an inherent latency induced by the image generating process. As such, the scene viewed by the pilot on the display unit closely approximates—but does not exactly match—the actual scene viewed by the pilot outside the aircraft.

BRIEF SUMMARY OF THE INVENTION

The embodiments disclosed herein present at least one novel and non-trivial system, device, and method for reducing the latency when generating an image. With the embodiments disclosed herein, the scene viewed by the pilot on the display unit will more closely match the actual scene located outside the aircraft.

In one embodiment, a system is disclosed for reducing image generating latency. The system may be comprised of a navigation data source and an image processing unit ("IPU"). The image data set could be representative of a predicted image of the scene outside an aircraft, where instant navigation data provided by the navigation data source may be used to determine predictive navigation data upon which the image data set is generated. Additionally, the system could include a source of an image data from which the image data set is generated, and a display system for presenting the image of on one or more display units.

In another embodiment, a device such as the IPU is disclosed for reducing image generating latency. This device may be configured to select a subset of the image data set based upon a comparison of two sets of navigation data acquired at different times. Differences arising from the comparison may be used in determining the location and/or rotation of a cropping frame within which the subset is selected and a cropped image is formed that is subsequently presented on the display unit.

In another embodiment, a method is disclosed for reducing image generating latency. When properly configured, the IPU may receive the image data set; receive (1) first navigation data of the first time from which second navigation data of the second time is determined or (2) second navigation data of the second time; receive third navigation data of the second time; compare the second navigation data with the third navigation data; and select a subset of the image data set in response to the comparison. In an additional embodiment, the IPU may provide the subset of the image data set to the display system, whereby the image represented in such subset is presented on one or more display units.

DETAILED DESCRIPTION OF THE INVENTION

In the following description, several specific details are presented to provide a thorough understanding of embodiments of the invention. One skilled in the relevant art will recognize, however, that the invention can be practiced without one or more of the specific details, or in combination with other components, etc. In other instances, well-known implementations or operations are not shown or described in detail to avoid obscuring aspects of various embodiments of the invention.

Figure 1:
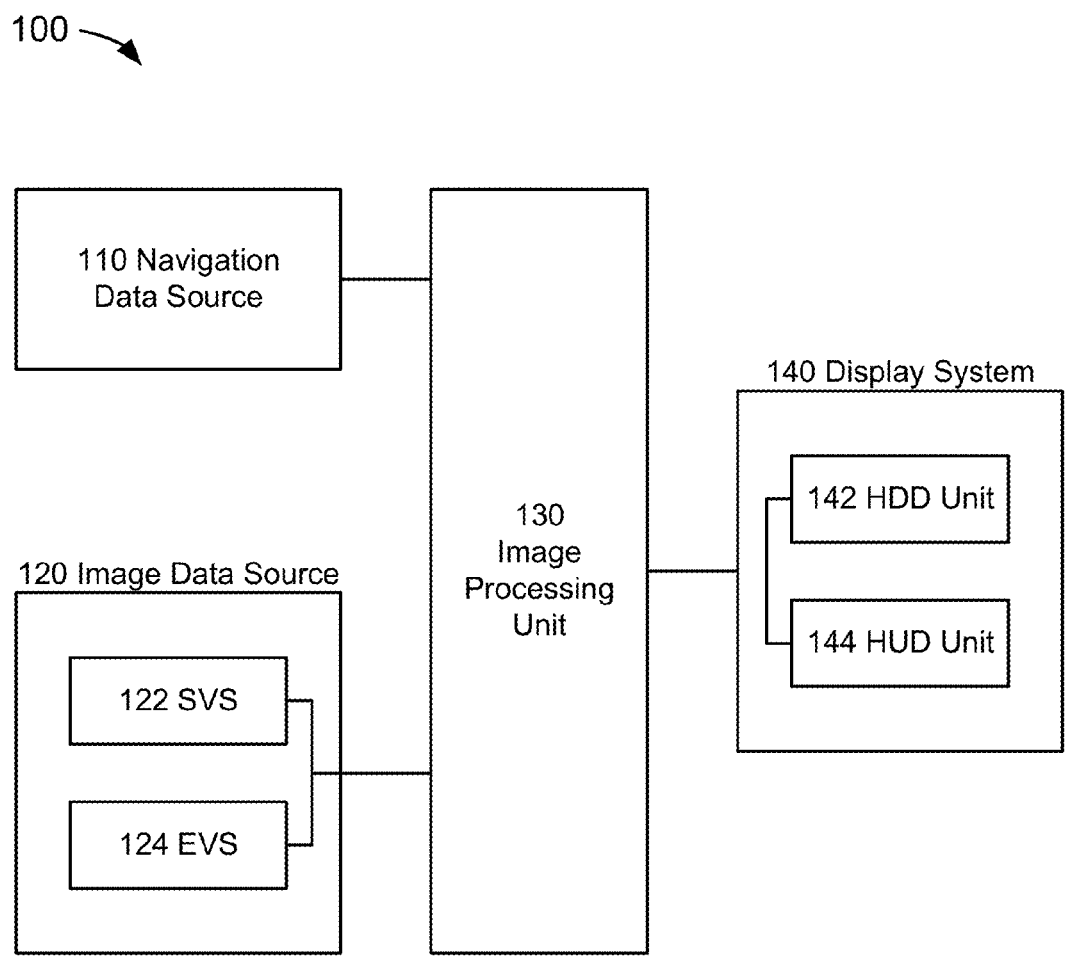
FIG. 1 depicts a block diagram of a system for generating a reduced-latency image presented on a display unit.

FIG. 1 depicts a block diagram of a reduced latency, image generating system 100 suitable for implementation of the techniques described herein. The image generating system 100 of an embodiment of FIG. 1 includes a navigation data source 110, an image data source 120, an image processing unit ("IPU") 130, and a display system 140.

In an embodiment of FIG. 1, the navigation data source 110 could be comprised of a system or systems that provide navigation data information in an aircraft. For the purposes of the disclosures discussed herein, an aircraft could mean any vehicle which is able to fly through the air or atmosphere including, but not limited to, lighter than air vehicles and heavier than air vehicles, wherein the latter may include fixed-wing and rotary-wing vehicles. Although the following discussion will be drawn to aircraft and pilots, the embodiments herein may be applied to any vehicle and vehicle operator.

The navigation data source 110 may include any system for providing navigation data including, but not limited to, an air/data system, an attitude heading reference system, an inertial guidance system (or inertial reference system), and a global navigation satellite system (or satellite navigation system), all of which are known to those skilled in the art. The navigation data source 110 could provide navigation data including, but not limited to, geographic position, altitude, and heading. As embodied herein, aircraft position includes geographic position (e.g., latitude and longitude coordinates), altitude, or both. As embodied herein, aircraft orientation may include pitch, roll, and/or yaw information related to the attitude of the aircraft. The navigation data source 110 could provide the navigation data to the IPU 130 for subsequent processing as discussed herein.

As embodied herein, the navigation data source 110 could also include a flight management system ("FMS") which could perform a variety of functions performed to help the crew in the management of the flight; these functions are known to those skilled in the art. These functions could include maintaining navigation data of the aircraft.

In an embodiment of FIG. 1, the image data source 120 may be comprised of any system or systems that could generate image data representative a three-dimensional perspective of the scene outside the aircraft including, but not limited to, a Synthetic Vision System ("SVS") 122 and/or Enhanced Vision System ("EVS") 124. The SVS 122 may be comprised of, in part, a terrain database and a separate processor, where the terrain database is provided to such processor for creating synthetic image data representative of a three-dimensional perspective of the scene outside the aircraft for subsequently presented on a two-dimensional display unit.

The EVS 124 may be comprised of, in part, at least one infrared sensor and a separate processor. Each sensor (e.g., a camera) may be mounted on the aircraft for detecting infrared radiation and/or non-visible, near-infrared radiation emanating from the scene in front of the aircraft, and the separate processor may receive sensor data to create enhanced image data representative of a three-dimensional perspective of the scene outside the aircraft for subsequently presented on a two-dimensional display unit.

As embodied herein, image data source 120 could also be comprised of a combined SVS-EVS system which combines synthetic image data with enhanced image data to form combined synthetic-enhanced image data. As embodied herein, the image data source 120 comprised of the SVS 122, the EVS 124, and/or the combined SVS-EVS could provide synthetic image data, enhanced image data, and/or synthetic-enhanced image data, respectively, to the IPU 130 for subsequent processing as discussed herein.

In an embodiment of FIG. 1, the IPU 130 may be any electronic data processing unit which executes software or computer instruction code that could be stored, permanently or temporarily, in a digital memory storage device or computer-readable media (not depicted herein) including, but not limited to, RAM, ROM, CD, DVD, hard disk drive, diskette, solid-state memory, PCMCIA or PC Card, secure digital cards, and compact flash cards. The IPU 130 may be driven by the execution of software or computer instruction code containing algorithms developed for the specific functions embodied herein. The IPU 130 may be an application-specific integrated circuit (ASIC) customized for the embodiments disclosed herein. Common examples of electronic data processing units are microprocessors, Digital Signal Processors (DSPs), Programmable Logic Devices (PLDs), Programmable Gate Arrays (PGAs), and signal generators; however, for the embodiments herein, the term "processor" is not limited to such processing units and its meaning is not intended to be construed narrowly. For instance, the processor could also consist of more than one electronic data processing unit. As embodied herein, the IPU 130 could be a processor(s) used by or in conjunction with any other system of the aircraft including, but not limited to, the navigation data source 110, the image data source 120, and the display system 140, or any combination thereof.

In the embodiment of FIG. 1, the display system 140 may receive image data from the IPU 130. The display system 140 could include any unit that provides flight information including, but not limited to, a Head-Down Display ("HDD") unit 142 and/or a Head-Up Display ("HUD") unit 144. As embodied herein, the disclosures may be applied to one or more portable devices including, but not limited to, laptop computer(s), smartphone(s), and/or tablet(s) which employ a display unit.

The HDD unit 142 may present flight information to the pilot or flight crew—information relevant to the instant or immediate control of the aircraft, whether the aircraft is in flight or on the ground. The HDD unit 142 is typically a unit mounted to an aircraft's flight instrument panel located in front of a pilot and below the windshield and the pilot's field of vision. The HDD unit 142 displays the same information found on a primary flight display ("PFD"), such as "basic T" information (i.e., airspeed, attitude, altitude, and heading). Although it provides the same information as that of a PFD, the HDD unit 142 may also display a plurality of indications or information including, but not limited to, selected magnetic heading, actual magnetic track, selected airspeeds, selected altitudes, altitude barometric correction setting, vertical speed displays, flight path angle and drift angles, flight director commands, limiting and operational speeds, mach number, radio altitude and decision height, final approach trajectory deviations, and marker indications. The HDD unit 142 is designed to provide flexible configurations which may be tailored to the desired configuration specified by a buyer or user of the aircraft.

Figure 2A:
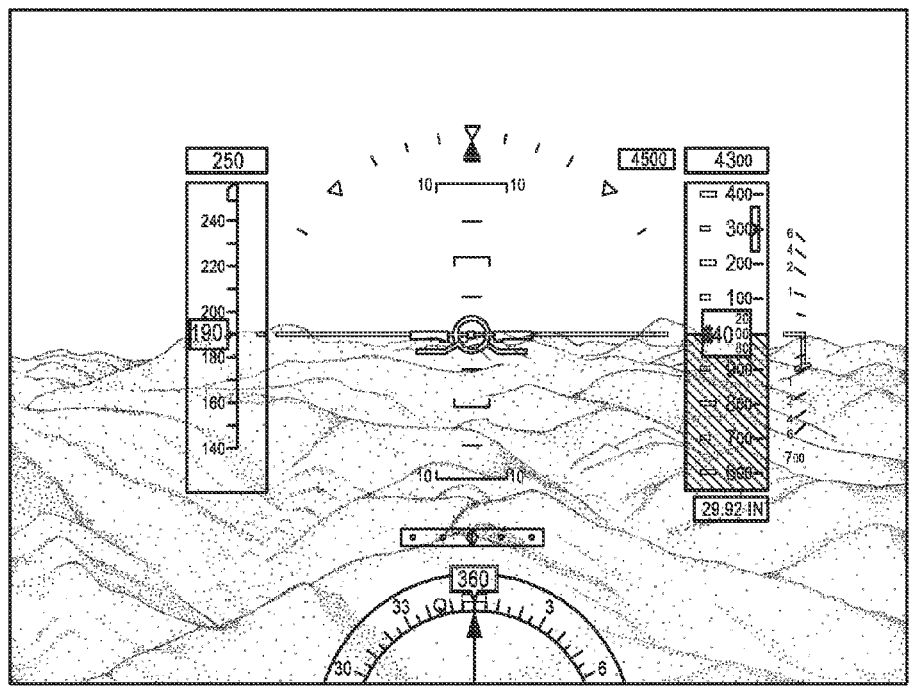
FIG. 2A provides an exemplary depiction of a Head-Down Display ("HDD") unit.

FIG. 2A provides an exemplary depiction of the HDD unit 142 for presenting flight information to the pilot or flight crew against the background of a three-dimensional image of terrain and sky; the HDD unit 142 could be employed as a display unit of the SVS 122, the EVS 124, or the combined SVS-EVS. It should be noted that the flight information depicted on the HDD unit 142 and has been made minimal for the sake of presentation and is not indicative of the plurality of indications or information with which it may be configured.

Returning to FIG. 1, the HUD unit 144 provides flight information to the pilot or flight crew in the pilot's forward field of view through the windshield, eliminating transitions between head-down to head-up flying. Similar to the HDD unit 142, the HUD unit 144 may be tailored to the desired configuration specified by a buyer or user of the aircraft. As embodied herein, the HDD unit 142, the HUD unit 144, or any display unit may receive an image data set from IPU 130 for subsequent presentation.

Figure 2B:
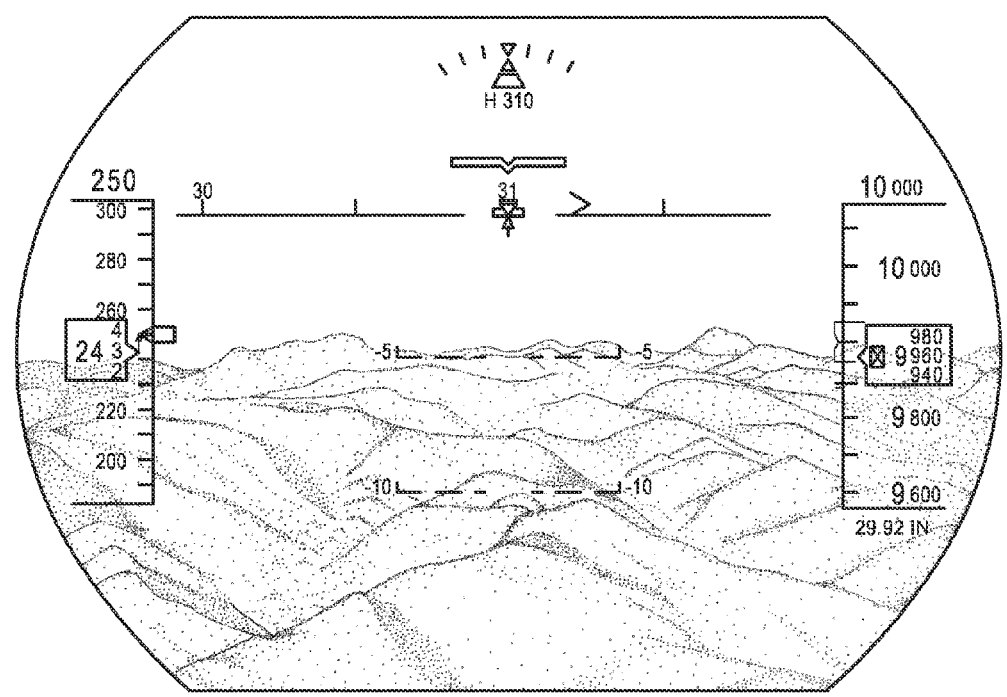
FIG. 2B provides an exemplary depiction of a Head-Up Display ("HUD") unit.

FIG. 2B provides an exemplary depiction of the HUD unit 144 for presenting flight information to the pilot or flight crew against the background of a three-dimensional image of terrain and sky, where such image is representative of and presented against the background of the actual terrain and sky located in the scene outside the aircraft; the HUD unit 144 could be employed as a display unit of the SVS 122, the EVS 124, or the combined SVS-EVS. It should be noted that the flight information depicted on the HUD unit 144 has been made minimal for the sake of presentation and is not indicative of the plurality of indications or information with which it may be configured.

Figure 3A:
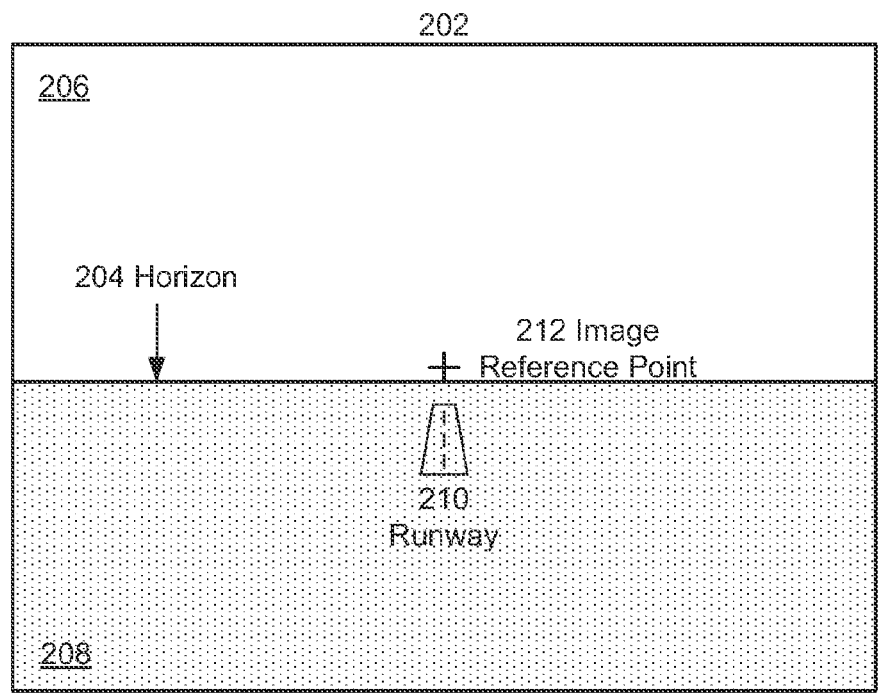
FIG. 3A provides an illustration of a predicted image represented in a image data set.
Figure 3B:
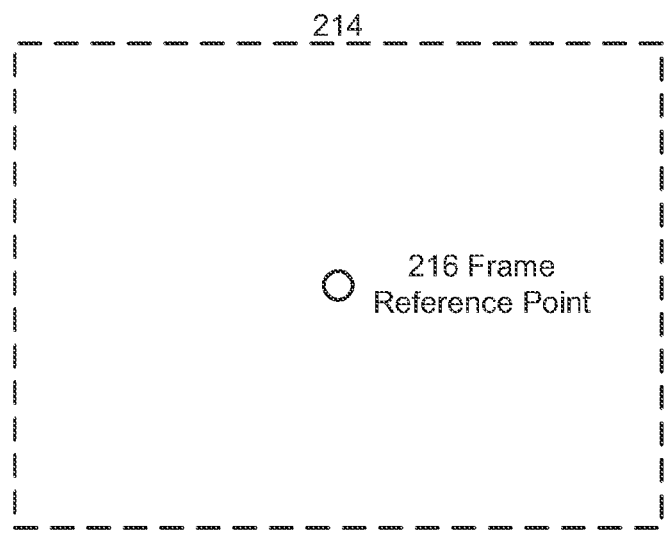
FIG. 3B illustrates an illustration of a cropping frame.

In the embodiments of FIGS. 3A and 3B, an image represented in an image data set and a cropping frame are illustrated, where such frame could be applied to the image data set to produce a cropped image that may be presented to the pilot. Referring to FIG. 3A, an exemplar of an image 202 that could be represented in an image data set is shown, where the image 202 is comprised of a horizon line 204 dividing the sky 206 and the surface 208 on which a runway 210 sits. The image 202 could be indicative of a synthetic image presenting a three-dimensional perspective of a predicted scene outside the aircraft comprised of the sky 206 and the surface 208 such as the perspectives presented on the display units of FIGS. 2A and 2B.

The image 202 could be generated by employing an image generating function(s) known to those skilled in the art and based upon a predictive navigation data such as, but not limited to, predictive aircraft position, predictive heading for a heading-based image, and/or predictive ground track for a track-based image. Predictive navigation data of a second time may be based upon instant navigation data of a first time and determined by employing navigation predicting function(s) known to those skilled in the art.

An image reference point ("IRP") 212 (shown as a plus sign) could be a reference point of the image 202 about which the image data set is generated. For the purpose of illustration only and not of limitation, the IRP 212 could correspond to predictive aircraft position and/or predictive heading and may be located in the center of the image. For example, if the size of the image data set is configured as 1600 pixels by 1200 pixels, the IRP 212 corresponding to predictive aircraft position and/or predictive heading could coincide with pixel location (800, 600), a point assumed as the center of the image for the purpose of illustration only. For the purpose of discussion herein, the horizontally-level horizon 204 and the location of the horizon 204 below the IRP 212 as shown in FIG. 3A is indicative of straight-and-level flight.

Referring to FIG. 3B, an exemplar of a cropping frame 214 that could be employed to crop the image 202 of the image data set by a cropping function that includes the disclosures disclosed herein. A frame reference point 216 ("FRP") (shown as a circle) could be a reference point of the frame 214 from which a subset of the image data set is selected. For the purpose of illustration only and not of limitation, the FRP 216 could correspond to the instant aircraft orientation and instant navigation parameters of a second time, and may be located in the center of the frame. For example, if the frame is configured as 1400 pixels by 1050 pixels, the FRP 216 could coincide with pixel location (700, 525), a point assumed as the center of the frame for the purpose of illustration only.

Figure 4A:
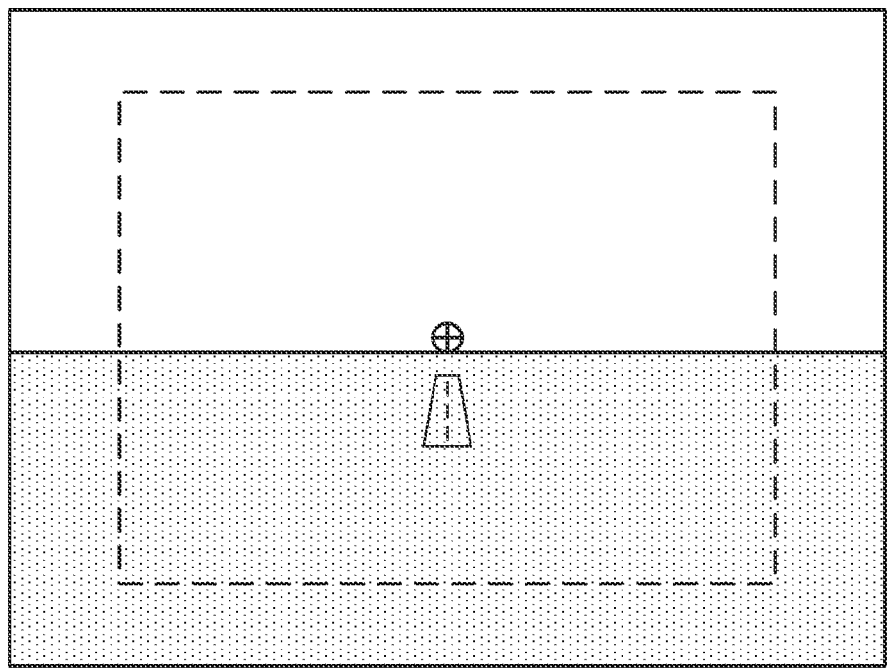
FIG. 4A illustrates a first placement of a cropping frame against an image of a predicted scene represented in an image data set.
Figure 4B:
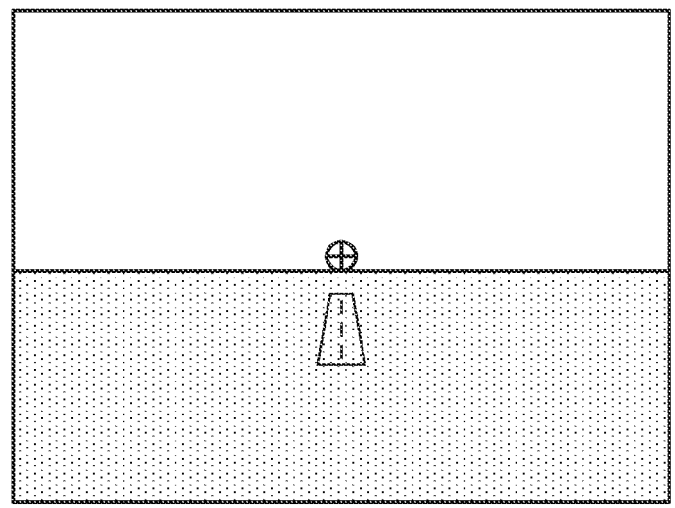
FIG. 4B illustrates the cropped image of FIG. 4A.

The advantages and benefits of the embodiments discussed herein may be disclosed by illustrating in FIGS. 4A through 4L the cropping of the image in a plurality of examples. In the example of FIGS. 4A and 4B, assume that the predictive navigation data determined at a previous time are the same as the instant navigation data at the instant time; that is, a prediction function made an accurate prediction. As shown in FIG. 4A, the image indicative of straight-and-level flight (as shown in FIG. 3A) and the predicted scene outside the aircraft (in which a runway appears directly ahead) have been generated based upon predictive navigation data, where the IRP corresponds to predictive navigation data and is centered within the image.

Moreover, the location of the FRP could depend upon the differences between instant navigation data and the predictive navigation data. Where there are no differences, the FRP may be configured to coincide with the IRP as shown in FIG. 4A. Then, the frame may be employed to crop the image, selecting a subset of the image data set representative of the cropped image (i.e., the image appearing within the frame). When the subset of the image data set is sent to the display unit, the cropped image of FIG. 4B centered on the FRP may be presented to the pilot (the IRP and FRP are not visible).

Figure 4C:
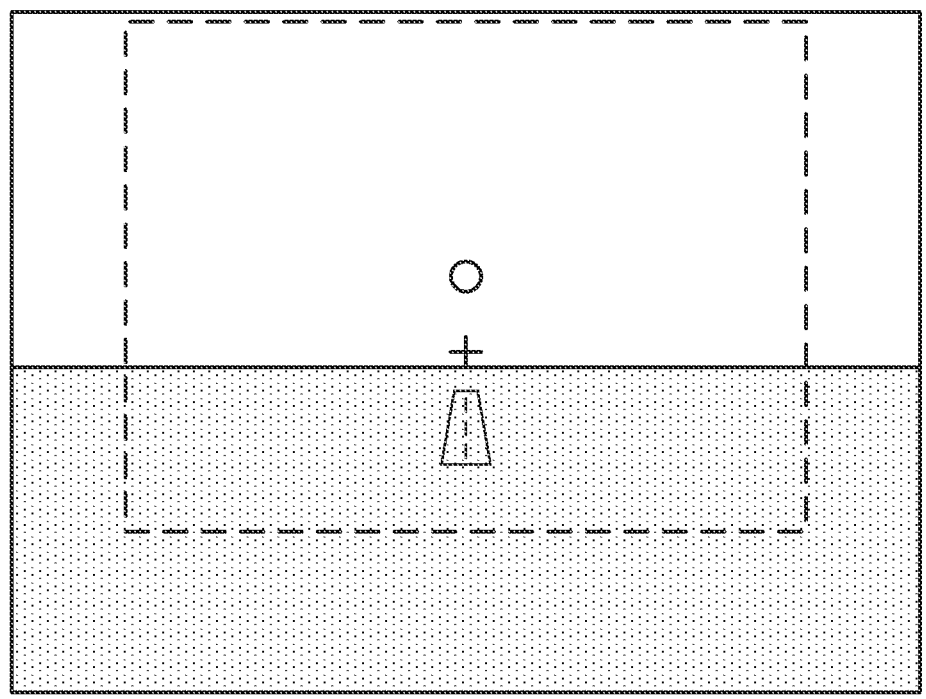
FIG. 4C illustrates a second placement of a cropping frame against an image of a predicted scene represented in an image data set.
Figure 4D:
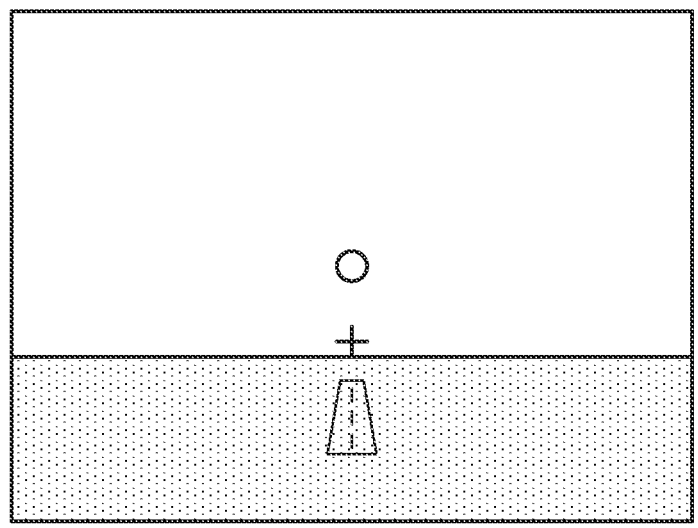
FIG. 4D illustrates the cropped image of FIG. 4C.

In the example of FIGS. 4C and 4D, assume that the predictive navigation data determined at a previous time correspond to straight-and-level flight, but the instant navigation data at the instant time correspond to a climbing attitude. As shown in FIG. 4C, the image indicative of straight-and-level flight and the predicted scene outside the aircraft have been generated based upon predictive navigation data, where the IRP corresponds to predictive navigation data and is centered within the image.

As stated above, the location of the FRP could depend upon the differences between instant navigation data and the navigation data. Here, the FRP is located above the IRP because the instant attitude of a climb exceeds the predictive attitude of straight-and-level. The screen or pixel distance between the FRP and the IRP may be commensurate with the difference between instant and predictive orientation measurements. Where the difference is commensurate with a known number of pixel rows, the FRP may be located above the IRP by such number of pixel rows. After the location of the FRP has been determined, the frame may be employed to crop the image, selecting a subset of the image data set representative of the cropped image. When the subset of the image data set is sent to the display unit, the cropped image of FIG. 4D centered on the FRP may be presented to the pilot.

Figure 4E:
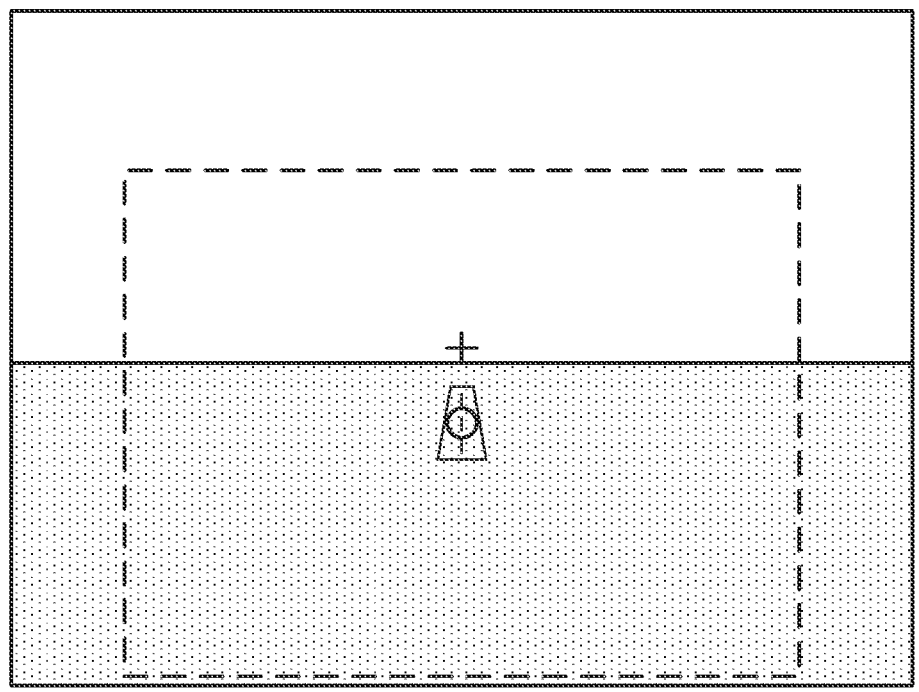
FIG. 4E illustrates a third placement of a cropping frame against an image of a predicted scene represented in an image data set.
Figure 4F:
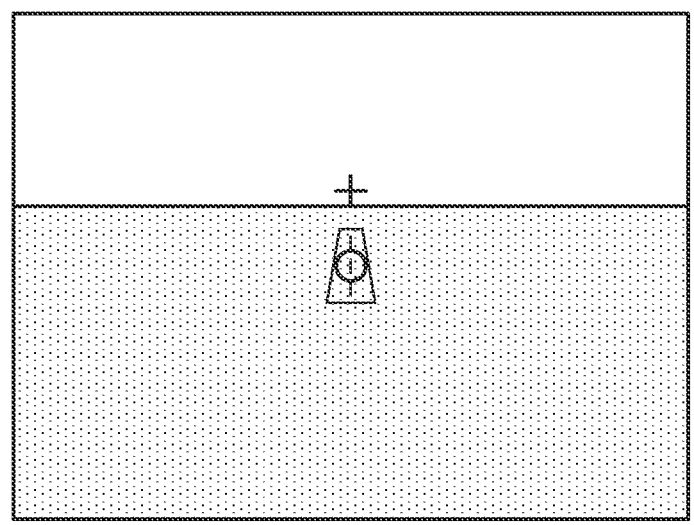
FIG. 4F illustrates the cropped image of FIG. 4E.

In the example of FIGS. 4E and 4F, assume that the predictive navigation data determined at a previous time correspond to straight-and-level flight, but the instant navigation data at the instant time correspond to a descending attitude. As shown in FIG. 4E, the image indicative of straight-and-level flight and the predicted scene outside the aircraft have been generated based upon predictive navigation data, where the IRP corresponds to predictive navigation data and is centered within the image.

As stated above, the location of the FRP could depend upon the differences between instant navigation data and the predictive navigation data. Here, the FRP is located below the IRP because the predictive attitude of straight-and-level exceeds the instant attitude of a descent. The screen or pixel distance between the FRP and the IRP may be commensurate with difference between instant and predictive orientation measurements; in this example, the FRP may be located below the IRP by a known number of pixel rows commensurate with the measurement of the difference. After the location of the FRP has been determined, the frame may be employed to crop the image, selecting a subset of the image data set representative of the cropped image. When the subset of the image data set is sent to the display unit, the cropped image of FIG. 4F centered on the FRP may be presented to the pilot.

Figure 4G:
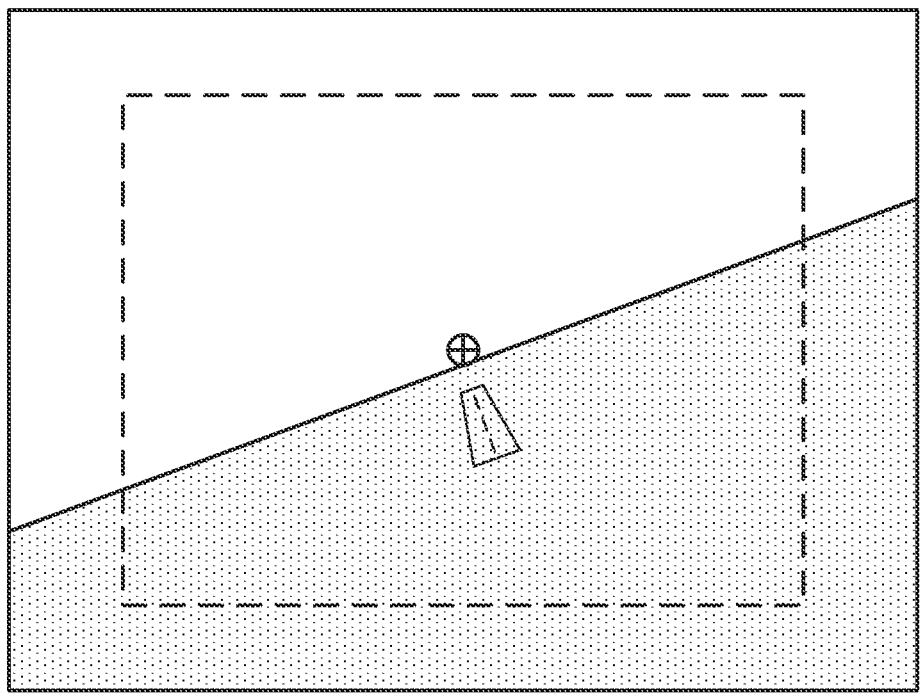
FIG. 4G illustrates a fourth placement of a cropping frame against an image of a predicted scene represented in an image data set.
Figure 4H:
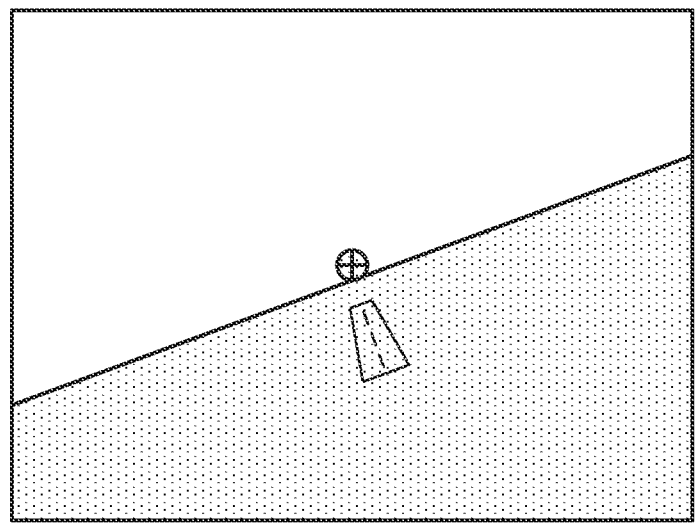
FIG. 4H illustrates the cropped image of FIG. 4G.

In the example of FIGS. 4G and 4H, assume that the predictive navigation data determined at a previous time are the same as the instant navigation data at the instant time. As shown in FIG. 4G, the image indicative of a level turn to the left and the predictive scene outside the aircraft have been generated based upon predictive navigation data, where the IRP corresponds to predictive navigation data and is centered within the image.

As stated above, the location of the FRP could depend upon the differences between instant navigation data and the predictive navigation data. Where there are no differences, the FRP may be configured to coincide with the IRP as shown in FIG. 4G. Then, the frame may be employed to crop the image, selecting a subset of the image data set representative of the cropped image. When the subset of the image data set is sent to the display unit, the cropped image of FIG. 4H centered on the FRP may be presented to the pilot.

Figure 4I:
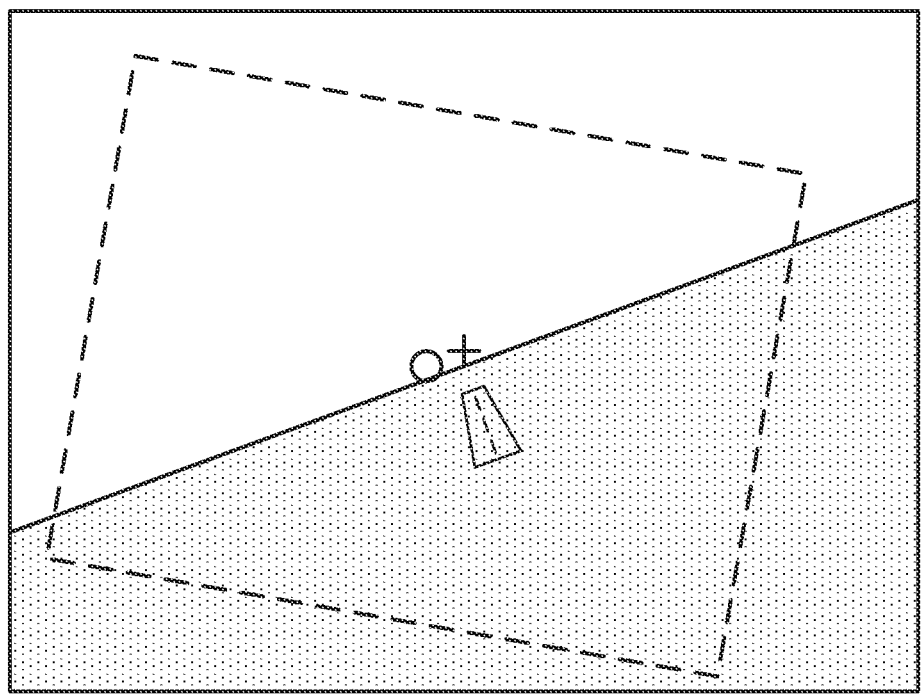
FIG. 4I illustrates a fifth placement of a cropping frame against an image of a predicted scene represented in an image data set.
Figure 4J:
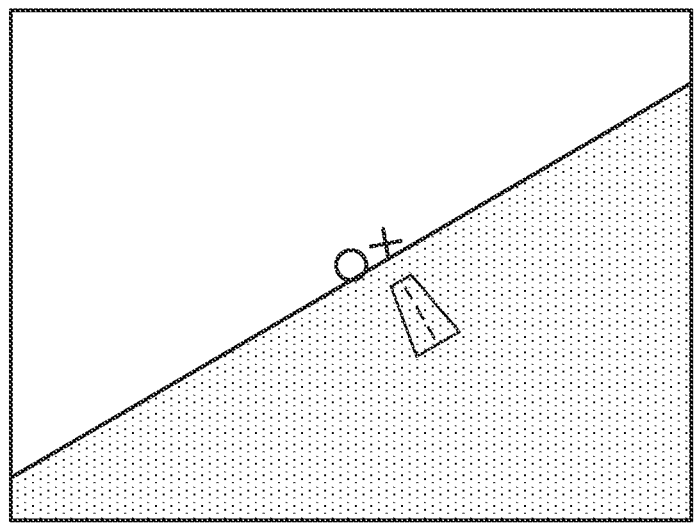
FIG. 4J illustrates the cropped image of FIG. 4I.

In the example of FIGS. 4I and 4J, assume that the predictive navigation data determined at a previous time correspond to a level turn to the left at a given turning angle, but the instant navigation data at the instant time correspond to a level left turn at a greater turning angle. As shown in FIG. 4I, the image indicative of a level, turning flight and the predicted scene outside the aircraft have been generated based upon predictive navigation data, where the IRP corresponds to predictive navigation data and is centered within the image.

As stated above, the location of the FRP could depend upon the differences between instant navigation data and the predictive navigation data. Here, the FRP is located to the left of the IRP because the instant heading is located to the left of the predictive heading due to the greater turning angle. In addition, the frame is rotated clockwise because the instant roll attitude exceeds the predictive roll attitude.

The screen or pixel distance between the FRP and the IRP may be commensurate with the difference between instant navigation data and predictive navigation data. Where the difference is commensurate with a known number of pixel columns, the FRP may be located to the left of the IRP by such number of pixel columns. Also, the clockwise rotation of the frame about the FRP may be commensurate with the difference between the measurements of instant roll attitude and predictive roll attitude. After the location of the FRP and the rotation of the frame have been determined, the frame may be employed to crop the image, selecting a subset of the image data set representative of the cropped image. When the subset of the image data set is sent to the display unit, the cropped image of FIG. 4J centered on the FRP may be presented to the pilot.

Figure 4K:
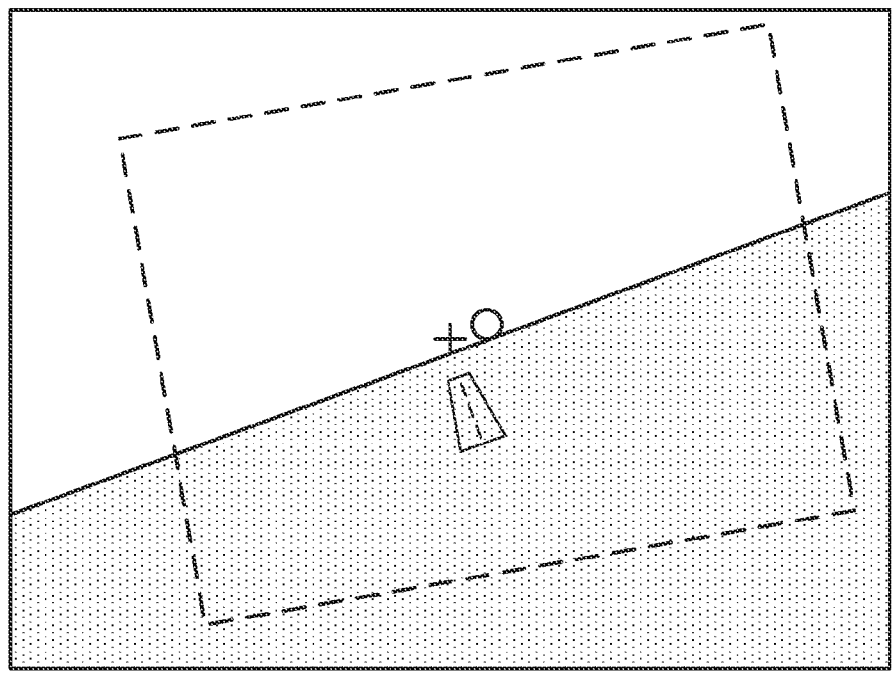
FIG. 4K illustrates a sixth placement of a cropping frame against an image of a predicted scene represented in an image data set.
Figure 4L:
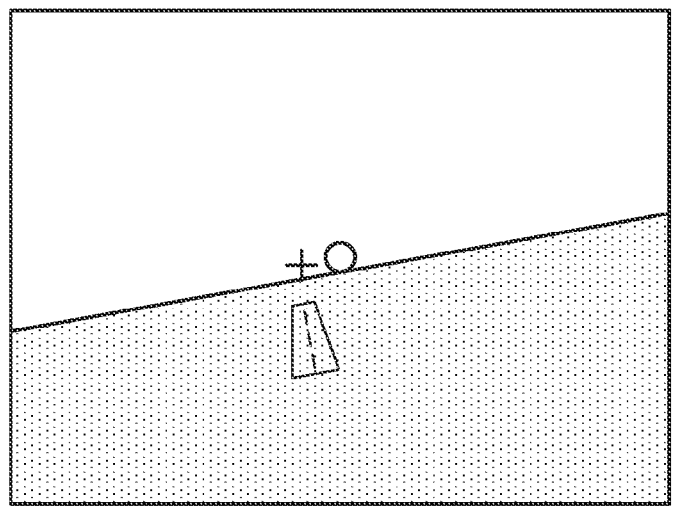
FIG. 4L illustrates the cropped image of FIG. 4K.

In the example of FIGS. 4K and 4L, assume that the predictive navigation data determined at a previous time correspond to a level turn to the left at a given angle, but the instant navigation data at the instant time correspond to a level left turn at a lesser turning angle. As shown in FIG. 4K, the image indicative of a level, turning flight and the predicted scene outside the aircraft have been generated based upon predictive navigation data, where the IRP corresponds to predictive navigation data and is centered within the image.

As stated above, the location of the FRP could depend upon the differences between instant navigation data and the predictive navigation data. Here, the FRP is located to the right of the IRP because the instant heading is located to the right of the predictive heading due to the lesser turning angle. In addition, the frame is rotated counterclockwise because the predictive roll attitude exceeds the instant roll attitude.

As stated above, the screen or pixel distance between the FRP and the IRP may be commensurate with the difference between instant navigation data and predictive navigation data. Where the difference is commensurate with a known number of pixel columns, the FRP may be located to the right of the IRP by such number of pixel columns. Also, the counterclockwise rotation of the frame about the FRP may be commensurate with the difference between the measurements of instant roll attitude and predictive roll attitude. After the location of the FRP and the rotation of the frame have been determined, the frame may be employed to crop the image, selecting a subset of the image data set representative of the cropped image. When the subset of the image data set is sent to the display unit, the cropped image of FIG. 4L centered on the FRP may be presented to the pilot.

Figure 5:
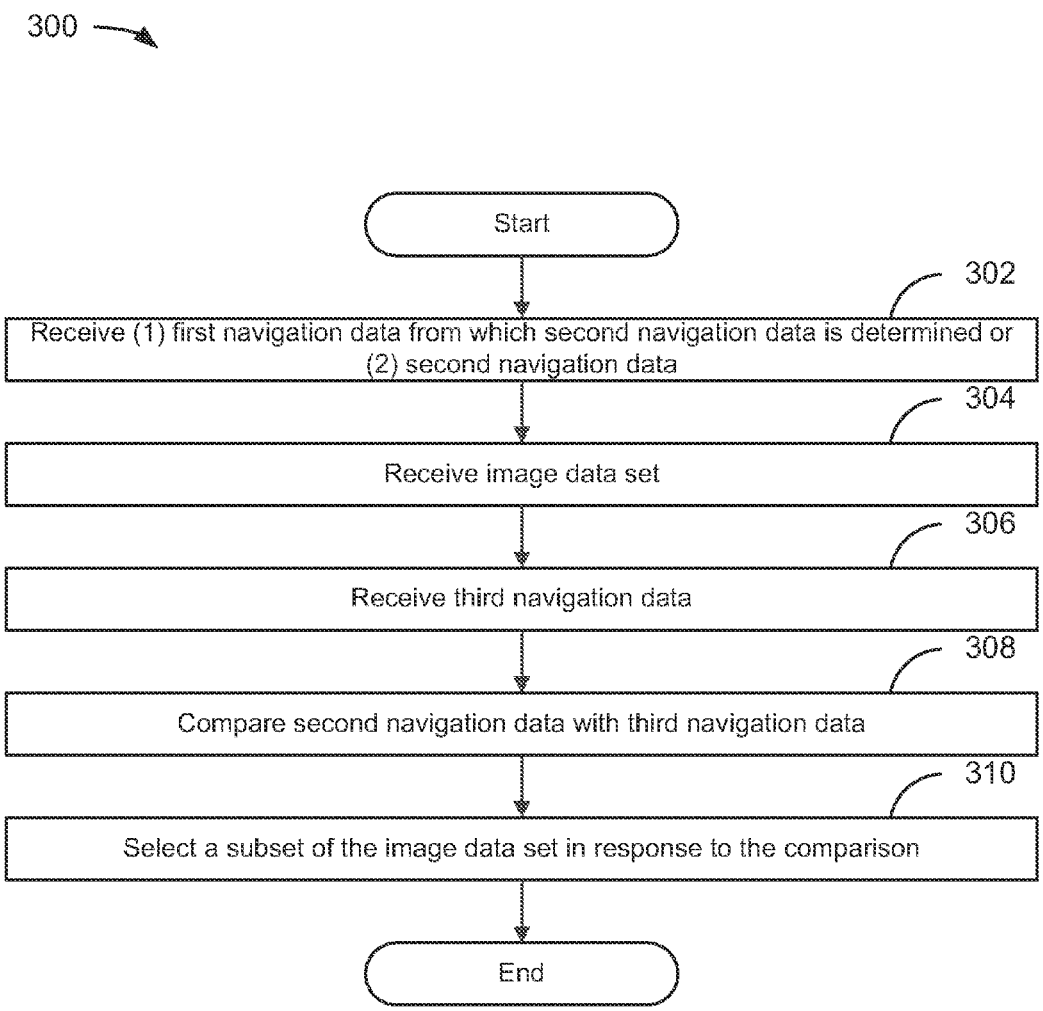
FIG. 5 provides a flowchart illustrating a method for reducing image generating latency.

In an embodiment of FIG. 5, flowchart 300 discloses an example of a method for generating a reduced-latency image presented on a display unit, where the IPU 130 may be programmed or configured with instructions corresponding to the following modules embodied in the flowchart. Also, the IPU 130 may be a processor of a module such as, but not limited to, a printed circuit board having one or more input interfaces to facilitate the two-way data communications of the IPU 130, i.e., to facilitate the receiving and providing of data. As necessary for the accomplishment of the following modules embodied in the flowchart, the receiving of data is synonymous and/or interchangeable with the retrieving of data, and the providing of data is synonymous and/or interchangeable with the making available or supplying of data.

Flowchart 300 begins with module 302 with the receiving of first navigation data of the first time or second navigation data of the second time. In one embodiment, the first navigation data could be received from the navigation system and applied to a navigation predicting function(s) to determine second navigation data of the second time. In another embodiment, the second navigation data could be received from the source of the image data set at the same time the image data set is received (as discussed in module 304). The first navigation data and the second navigation data could be representative of at least aircraft orientation and/or direction, and such first and second navigation data could be data included in the fourth and fifth navigation data, respectively.

The method continues with module 304 with the receiving of an image data set. The image data set may be representative of an image of a predicted scene outside an aircraft. The image data set could be generated from fourth navigation data of a first time received from the navigation system that is applied to a navigation predicting function(s) to determine fifth navigation data of a second time. A correspondence could be set between an IRP of the image of the image data set and the fifth navigation data; that is, a correspondence could be set between the IRP and the aircraft position and/or aircraft direction represented in the fifth navigation data. In an additional embodiment, the image could be a synthetic image presenting a three-dimensional perspective of the predicted scene outside the aircraft, where terrain data has been retrieved from a terrain data source (e.g., a terrain database) based upon the predictive navigation data.

The method continues with module 306 with the receiving third navigation data at the second time, where the third navigation data could be representative of at least aircraft orientation and/or direction. The method continues with module 308 with the comparing of second navigation data of the second time with the third navigation data of the second time. The comparison could determine the differences, if any, between at least aircraft orientation and/or direction of the second navigation data and the third navigation data.

The method continues with module 310 with the selecting a subset of the image data set in response to the comparison. If the result of the comparison indicates an absence of differences between aircraft orientations and/or directions, the FRP for a frame and the IRP of the image may coincide. Then, the frame may be employed to crop the image, selecting a subset of the image data set representative of the cropped image.

If the result of the comparison indicates a presence of one or more differences between aircraft orientations and/or directions, then the location of the FRP and/or the rotation of the frame could depend upon these difference(s), where the screen or pixel distance between the FRP and the IRP and/or angular rotation of the frame may be commensurate with the difference(s). Then, the frame may be employed to crop the image, selecting a subset of the image data set representative of the cropped image.

In an additional embodiment, the image data set could be provided to a display unit configured to receive such data and present the image represented in the image data set on the screen of the display unit. Where the FRP coincides with the center of the frame and the image occupies the entire screen, the image may be centered on the screen. Then, the flowchart proceeds to the end.

It should be noted that the method steps described above may be embodied in computer-readable media as computer instruction code. It shall be appreciated to those skilled in the art that not all method steps described must be performed, nor must they be performed in the order stated.

As used herein, the term "embodiment" means an embodiment that serves to illustrate by way of example but not limitation.

It will be appreciated to those skilled in the art that the preceding examples and embodiments are exemplary and not limiting to the scope of the present invention. It is intended that all permutations, enhancements, equivalents, and improvements thereto that are apparent to those skilled in the art upon a reading of the specification and a study of the drawings are included within the true spirit and scope of the present invention. It is therefore intended that the following appended claims include all such modifications, permutations and equivalents as fall within the true spirit and scope of the present invention.

What is claimed is:

1. A system for generating an image presented on a display unit, such system comprising:
   a navigation system; and
   an image processing unit configured to:
      receive first navigation data of a first time or second navigation data predicted to occur at a second time, where
         the first navigation data is representative of at least first aircraft position and a plurality of first attitude parameters,
         the second navigation data is representative of at least second aircraft position and a plurality of second attitude parameters, and
         the first navigation data of the first time is used to determine second navigation data predicted to occur at the second time if the first navigation data of the first time is received;
      receive third navigation data at the second time from the navigation system, where
         the third navigation data is representative of at least third aircraft position and a plurality of third attitude parameters;
      compare the second navigation data predicted to occur at the second time with the third navigation data received at the second time;
      receive an image data set generated as a function of the second navigation data and representative of an image of an outside scene;
      select a subset of the image data set in response to the comparison; and
      provide the subset of the image data set to a display system, whereby
         an image represented in the subset of the image data set is presentable to at least one viewer.

2. The system of claim 1, wherein
   the image data set is generated as a function of fourth navigation data of the first time, where
      the fourth navigation data includes data of the first navigation data.

3. The system of claim 1, wherein the image data set is received from a source of image data.

4. The system of claim 1, wherein
   the selection of the subset of the image data set employs a cropping frame, where
      a location and a rotation of the cropping frame with respect to the image of the outside scene is dependent upon differences, if any, between the second navigation data and the third navigation data determined from the comparison.

5. The system of claim 4, wherein
   a vertical distance between a frame reference point of the cropping frame and an image reference point of the image of the outside scene is commensurate to the difference, if any, between measurements of pitch attitude represented in the second navigation data and the third navigation data,
   a horizontal distance between the frame reference point and the image reference point is commensurate to the difference, if any, between measurements of direction represented in the second navigation data and the third navigation data, and
   a rotation of the cropping frame about the frame reference point is commensurate to the difference, if any, between measurements of roll attitude in the second navigation data and the third navigation data.

6. The system of claim 5, wherein
   the measurements of direction are comprised of;
      measurements of heading, or
      measurements of ground track.

7. A device for generating a an image presented on a display unit, such device comprising:
   an image processing unit configured to
      receive first navigation data of a first time or second navigation data predicted to occur at a second time, where
         the first navigation data is representative of at least first aircraft position and a plurality of first attitude parameters, the second navigation data is representative of at least second aircraft position and a plurality of second attitude parameters, and the first navigation data of the first time is used to determine second navigation data predicted to occur at the second time if the first navigation data of the first time is received;

receive third navigation data at the second time from the navigation system, where the third navigation data is representative of at least third aircraft position and a plurality of third attitude parameters;

compare the second navigation data predicted to occur at the second time with the third navigation data received at the second time;

receive an image data set generated as a function of the second navigation data and representative of an image of an outside scene;

select a subset of the image data set in response to the comparison; and provide the subset of the image data set to a display system, whereby an image represented in the subset of the image data set is presentable to at least one viewer.

8. The device of claim 7, wherein
the image data set is generated as a function of fourth navigation data of the first time, where
the fourth navigation data includes data of the first navigation data.

9. The device of claim 7, wherein the image data set is received from a source of image data.

10. The device of claim 7, wherein
the selection of the subset of the image data set employs a cropping frame, where
a location and a rotation of the cropping frame with respect to the image of the outside scene is dependent upon differences, if any, between the second navigation data and the third navigation data determined from the comparison.

11. The device of claim 10, wherein
a vertical distance between a frame reference point of the cropping frame and an image reference point of the image of the outside scene is commensurate to the difference, if any, between measurements of pitch attitude represented in the second navigation data and the third navigation data,
a horizontal distance between the frame reference point and the image reference point is commensurate to the difference, if any, between measurements of direction represented in the second navigation data and the third navigation data, and
a rotation of the cropping frame about the frame reference point is commensurate to the difference, if any, between measurements of roll attitude in the second navigation data and the third navigation data.

12. The device of claim 11, wherein
the measurements of direction are comprised of
measurements of heading, or
measurements of ground track.

13. A method for generating a an image presented on a display unit, such method comprising:
receiving first navigation data of a first time or second navigation data predicted to occur at a second time, where the first navigation data is representative of at least first aircraft position and a plurality of first attitude parameters, the second navigation data is representative of at least second aircraft position and a plurality of second attitude parameters, and the first navigation data of the first time is used to determine second navigation data predicted to occur at the second time if the first navigation data of the first time is received;

receiving third navigation data at the second time from the navigation system, where the third navigation data is representative of at least third aircraft position and a plurality of third attitude parameters;

comparing the second navigation data predicted to occur at the second time with the third navigation data received at the second time;

receiving an image data set generated as a function of the second navigation data and representative of an image of an outside scene;

selecting a subset of the image data set in response to the comparison; and providing the subset of the image data set to a display system, whereby an image represented in the subset of the image data set is presentable to at least one viewer.

14. The method of claim 13, wherein
the image data set is generated as a function of fourth navigation data of the first time, where
the fourth navigation data includes data of the first navigation data.

15. The method of claim 13, wherein the image data set is received from a source of image data.

16. The method of claim 13, wherein
the selection of the subset of the image data set employs a cropping frame, where
a location and a rotation of the cropping frame with respect to the image of the outside scene is dependent upon differences, if any, between the second navigation data and the third navigation data determined from the comparison.

17. The method of claim 16, wherein
a vertical distance between a frame reference point of the cropping frame and an image reference point of the image of the outside scene is commensurate to the difference, if any, between measurements of pitch attitude represented in the second navigation data and the third navigation data,
a horizontal distance between the frame reference point and the image reference point is commensurate to the difference, if any, between measurements of direction represented in the second navigation data and the third navigation data, and
a rotation of the cropping frame about the frame reference point is commensurate to the difference, if any, between measurements of roll attitude in the second navigation data and the third navigation data.

18. The method of claim 17, wherein
the measurements of direction are comprised of
measurements of heading, or
measurements of ground track.

* * * * *